United States Patent
Baker et al.

(10) Patent No.: US 8,242,449 B2
(45) Date of Patent: Aug. 14, 2012

(54) LIGHT ACTIVATED CONFIGURATION OF ENVIRONMENTALLY SEALED METERING PRODUCTS

(75) Inventors: Marvin C. Baker, Wake Forest, NC (US); Steven D. Bragg, Rolesville, NC (US)

(73) Assignee: Elster Solutions, LLC, Raleigh, NC (US)

( * ) Notice: Subject to any disclaimer, the term of this patent is extended or adjusted under 35 U.S.C. 154(b) by 192 days.

(21) Appl. No.: 12/759,288

(22) Filed: Apr. 13, 2010

(65) Prior Publication Data

US 2011/0248169 A1    Oct. 13, 2011

(51) Int. Cl.
*G01J 1/42*    (2006.01)
(52) U.S. Cl. ....................................................... 250/340
(58) Field of Classification Search ............... 250/336.1; 324/110, 156; 361/659, 672
See application file for complete search history.

(56) References Cited

U.S. PATENT DOCUMENTS

| | | | |
|---|---|---|---|
| 4,298,839 A * | 11/1981 | Johnston | 324/157 |
| 4,642,634 A | 2/1987 | Gerri et al. | |
| 5,422,565 A * | 6/1995 | Swanson | 324/110 |
| 6,118,269 A * | 9/2000 | Davis | 324/110 |
| 6,256,128 B1 | 7/2001 | Lavoie et al. | |
| 6,823,273 B2 | 11/2004 | Ouellette et al. | |
| 6,832,339 B1 | 12/2004 | Reed et al. | |
| 7,417,420 B2 | 8/2008 | Shuey | |
| 2009/0153357 A1 | 6/2009 | Bushman et al. | |

* cited by examiner

*Primary Examiner* — David Porta
*Assistant Examiner* — Marcus Taningco
(74) *Attorney, Agent, or Firm* — Woodcock Washburn LLP (57) ABSTRACT

A metering device and a method for reconfiguring the device to satisfy those regulatory agencies that require that a metering device be disassembled in some way prior to allowing any reconfiguration of the device, but do so without breaking or otherwise affecting the environmental sealing of the device.

21 Claims, 6 Drawing Sheets

LIGHT ACTIVATED CONFIGURATION OF ENVIRONMENTALLY SEALED METERING PRODUCTS

TECHNICAL FIELD

The present disclosure relates to metering devices, such as electricity, water and gas meters, and more particularly, to methods and apparatus for reconfiguring same.

BACKGROUND

Certain utilities and regulatory agencies require that fielded products, such as metering devices (e.g., gas, water and electricity meters), be resistant to tampering. One form of tampering involves surreptitiously changing the configuration of the metering device (e.g., firmware or settings) in a manner that is beneficial to the utility customer, but detrimental to the utility that is trying to meter usage of, and to charge for, a given commodity.

Some regulatory agencies require that metering devices be "sealed" in such a way that the device must be disassembled prior to allowing any reconfiguration of the device. During the disassembly, tampering indicators (e.g., tamper plugs, sealing rings, etc.) must be broken. An authorized field service technician tasked with reconfiguring the device can then reassemble the device and replace the tampering indicators with new ones after performing an authorized reconfiguration. However, an unauthorized person who changes the configuration of the device will not be able to replace the tamper indicators after reassembly, and therefore, those indicators provide evidence of the device tampering.

A problem posed by regulations that require some disassembly of a metering device before reconfiguration can be performed is that the requisite disassembly may also break important environmental seals that are designed to protect the internal components of the meter from adverse environmental conditions. That is, if a field service person must do something physical to the device in order to allow reconfiguration, it is likely that this action will damage the environmental sealing of the device. For example, if a jumper on a printed circuit board of the device must be removed or installed to allow reconfiguration, and the printed circuit board has been previously environmentally sealed with a conformal coating, potting or vacuum deposition substance, such as parylene, then the physical action of removing or installing the jumper will break the environmental coating, making the device vulnerable to contamination. Moreover, if the field service technician must touch-up or repair the environmental sealing after penetrating it, that work can be messy, costly, ineffective and ultimately expensive.

SUMMARY

A metering device, and a method for reconfiguring the device, are disclosed that satisfy those regulatory agencies that require that a metering device be disassembled in some way prior to allowing any reconfiguration of the device, but that do so without breaking or otherwise affecting the environmental sealing of the device.

In one embodiment, a metering device comprises a housing containing at least one circuit board comprising a processor and a light-sensitive device in electrical communication with the processor. The housing has at least one window disposed proximate the light-sensitive device. The light-sensitive device is configured to detect light passing through the at least one window into the housing and to provide a signal indicating same to the processor. The processor is configured to prevent reconfiguration of the metering device when no light is detected by the light-sensitive device. At least one other component is detachably coupled to the housing. When that at least one other component is coupled to the housing, light is prevented from passing through said at least one window and into the housing. At least one tamper indicator is also installed on the device to provide a physical indication whenever the at least one other component is detached from the housing. The processor may record information indicating that it has received the signal from the light-sensitive device and/or the reconfiguration event, and that information may be communicated via communications circuitry to a field technician and/or a utility.

In one embodiment, a method of reconfiguring the metering device comprises: (a) detaching the at least one other component from the housing such that the at least one tamper indicator is caused to provide a physical indication of the detachment; (b) enabling light to pass through the at least one window of the housing; and (c) thereafter communicating with the processor to reconfigure the metering device. Once reconfigured, the at least one other component may be reattached to the housing, and the tamper indicator(s) may be replaced or repaired.

Other features of the metering device and method of reconfiguring it will become evident from the following description and accompanying figures.

BRIEF DESCRIPTION OF THE DRAWINGS

The foregoing summary, as well as the following detailed description, are better understood when read in conjunction with the appended drawings. For the purpose of illustrating the invention, there is shown in the drawings exemplary embodiments; however, the invention is not limited to the specific methods and instrumentalities disclosed. In the drawings:

FIG. 3b is a back perspective view of the housing of FIG. 3a;

DETAILED DESCRIPTION

A metering device, and a method for reconfiguring the device, are described below that satisfy those regulatory agencies that require that a metering device be disassembled in some way prior to allowing any reconfiguration of the device, but that do so without breaking or otherwise affecting the environmental sealing of the device. While exemplary embodiments of the metering device and method are provided below, it is understood that the invention is not limited to those specific embodiments. Also, while certain details have been provided to illustrate the embodiments described below, it is understood that the invention may be practiced without those specific details. Acronyms and other terms may be used in the following description, however they are not intended to limit the scope of the invention as defined by the appended claims.

Figure 1:
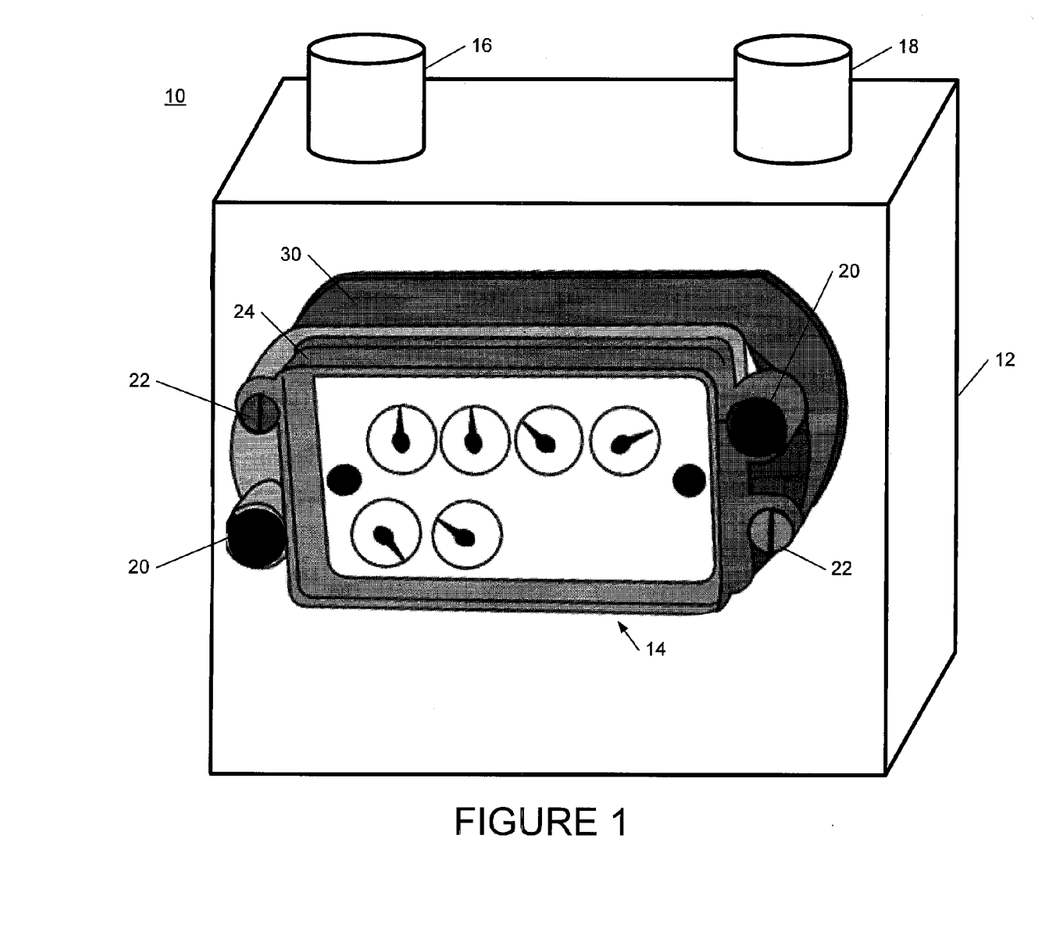
FIG. 1 is a perspective view of one embodiment of a metering device in which the invention is employed.

FIG. 1 is a perspective view of one embodiment of a metering device 10 in which the invention is employed. In this embodiment, the metering device 10 comprises a gas meter for measuring the flow of natural gas at a utility customer's home or place of business. However, the invention is not limited to use in or with a gas meter, but may be employed in any device that meters the consumption of a resource, such as electricity, water or gas. For example, the metering device 10 may alternatively comprise a water meter or an electricity meter, and the light sensitive device and related components described below may be embedded in the meter, rather than part of a module that is attached to the meter.

As shown in FIG. 1, the metering device 10 may comprise a register module 14 that is attached to a main body 12 of the meter. The metering device 10 may further comprise an inlet 16 and an outlet 18 through which the resource being metered (e.g., gas or water) may flow. In the case of an electricity meter, the inlet 16 and outlet 18 may comprise electrical connections.

As further shown, the register module 14 may comprise a housing 30, which houses other components (not shown) within it and may provide some level of protection of those components from the environment. For example, the housing 30 may be sealed with gaskets such that air, water or another potential contaminant in the environment surrounding the device may be prevented or hindered from entering the housing 30. A printed circuit board and other electrical components within the housing (described below but not shown in FIG. 1) may themselves be sealed with additional environmental sealing materials to provide more extensive protection of such electronics from moisture or other contaminants. For example, such environmental sealing of the electronics may include, without limitation, conformal coatings, potting and/ or vacuum deposition (using parylene for example).

The register module 14 may further comprise at least one other component that is detachably coupled to the housing 30. For example, in this embodiment, a cover 24 is detachably coupled to the housing 30. In other embodiments, the other component(s) may take any of a wide variety of forms. For example, such detachable component(s) may simply comprise bolts, screws or other means for securing the housing 30 to the main body of the meter.

In accordance with the methods and apparatus described herein, the register module 14 may further comprise at least one tamper indicator that provides a physical indication when such other component(s) is/are detached from the housing 30.

In the present example, the cover 24 is attached to the housing 30 via four bolts 22, only two of which are visible in FIG. 1. The other two bolts are obscured by two tamper indicators 20. In the present embodiment, each tamper indicator 20 comprises a tamper plug. However, other forms of tamper indicators may alternatively be used, including without limitation, sealing rings, sealing wires or similar indicators. Regardless of the form, the purpose of the tamper indicator is to provide some indication, usually physical, that an attempt has been made to detach the additional component (e.g., cover 24) from the housing 30. For example, in the case of the tamper plugs 20 shown in FIG. 1, each tamper plug 20 would need to be removed in order to access the two bolts that are obscured by those tamper plugs. Doing so will break, deform or otherwise destroy the tamper plugs, thereby providing a physical indication that an effort has been made to detach the cover 24 from the housing 30. Sealing rings, wires or other tamper indicators would preferably function in a similar manner. Also, as mentioned below, with the addition of the light sensitive device and related components described below, there is an electronic record of such disassembly may also be recorded.

Figure 2:
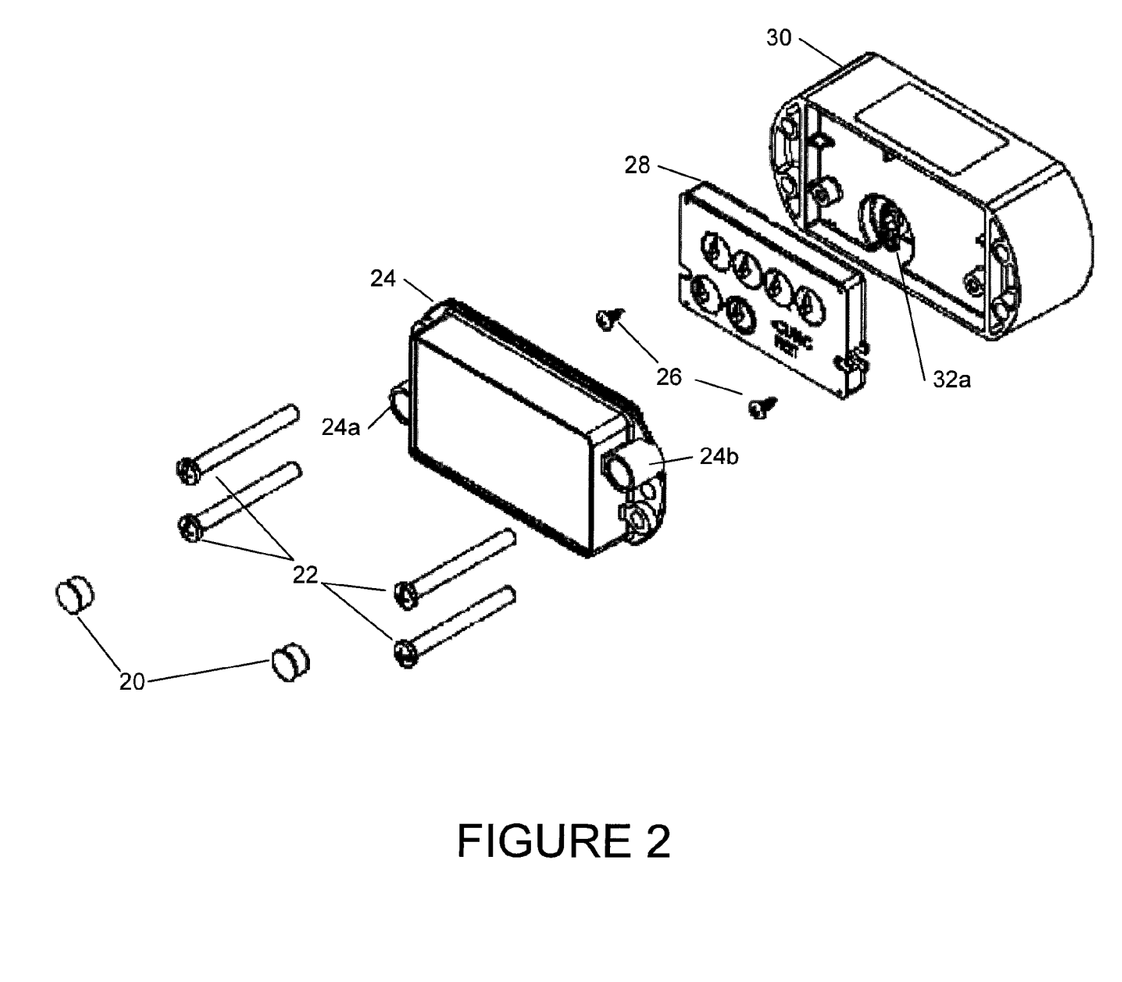
FIG. 2 is an exploded view of the metering device of FIG. 1.

FIG. 2 is an exploded view of the metering device 10 of FIG. 1. As further shown, in the present embodiment, the cover 24 houses an index assembly 28 that is secured to the housing 30 by screws 26. In other embodiments, the cover 24 may not house any components.

As mentioned above, in the present embodiment, the cover 24 is detachably coupled to the housing 30 using four bolts 22. Also in the present embodiment, two tamper indicators 20 (e.g., tamper plugs) are installed into respective cylindrical openings 24a and 24b over the heads of two of the four bolts 22. In other embodiments, other means may be used to detachably couple the cover 24 (or some other component) to the housing, including without limitation, screws, latches and/or an adhesive. Also, the tamper indicator(s) may take any suitable form that provides an indication that the cover 24 (or some other component) has been detached from the housing 30.

Further according to the methods and apparatus described herein, the housing 30 comprises at least one window that may be exposed to light once the other component (e.g., cover 24) is detached from the housing 30. In the present example, the housing 30 includes two windows that may become exposed to light when the cover 24, index assembly 28 and housing 30 are disassembled from the main body of the meter 10. One window 32a is visible in FIG. 2. The other window 32b is on the opposite side of the housing 30 and can be seen in FIG. 3b. As is apparent from FIG. 2, when the index assembly 28 is coupled to the housing 30, and the housing 30 is coupled to the main body 12 of the meter, the windows 32a and 32b are covered, thereby preventing light from passing through the window(s) into the housing 30.

Figure 3A:
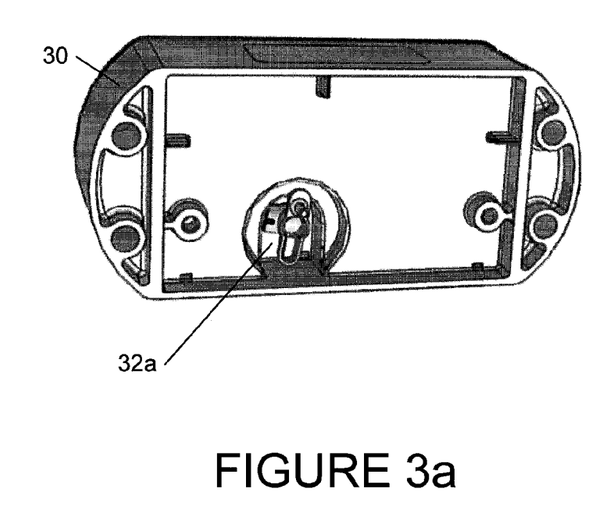
FIG. 3a is a front perspective view of a housing of the metering device of FIG. 1.
Figure 3B:
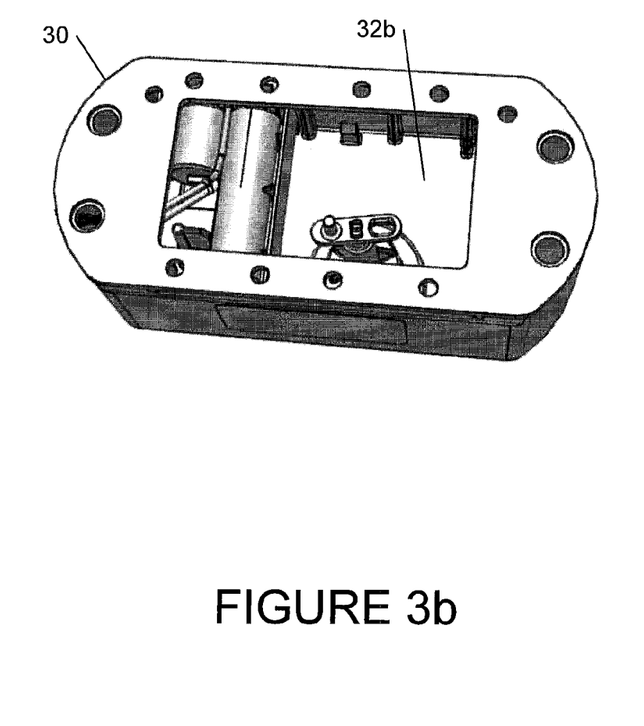

FIG. 3a is a front perspective view providing additional details of one embodiment of the housing 30. FIG. 3b is a back perspective view of the housing 30. As described more fully below, in the present embodiment, the housing 30 contains a printed circuit board (not shown in FIGS. 3a and 3b) having a processor and a light-sensitive device in electrical communication with the processor. Preferably, the light-sensitive device is disposed proximate to at least one of the window(s) 32a, 32b of the housing 30 such that light passing through the window(s) will impinge upon the light-sensitive device.

Figure 4:
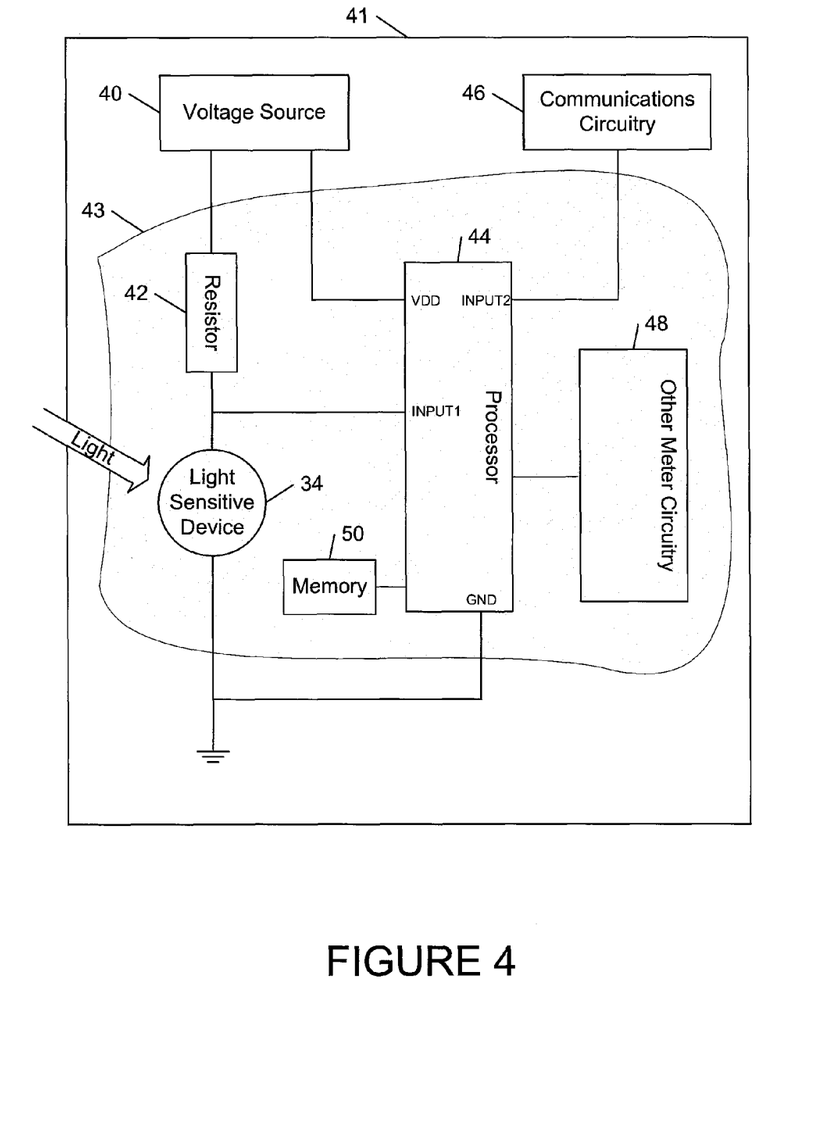
FIG. 4 is a diagram of one embodiment of a circuit board within the housing of the metering device.

FIG. 4 is a diagram of one embodiment of a circuit board 41 that may be disposed within the housing 30. As shown, the circuit board 41 includes the aforementioned light-sensitive device 34. In addition to the light-sensitive device 34, the circuit board 41 may also comprise a processor 44, a voltage source 40, communications circuitry 46, and other circuitry 48 that may be required for metering the particular resource or commodity for which the device may be employed. In other embodiments, one or all of these components may reside on two or more circuit boards having suitable electrical connections between them.

In one embodiment, the voltage source 40 may comprise a battery. In other embodiments, other voltage sources may be employed. For example, in an electricity meter, the voltage source may be a power supply that receives a power-line voltage and converts that voltage to a voltage suitable for powering the components within the housing.

The light-sensitive device 34 is configured to detect light passing through the window(s) 32a and/or 32b of the housing 30 and to provide a signal indicating same to the processor. As shown, in one embodiment, the light-sensitive device 34 comprises a phototransistor that operates as a light-sensitive switch. The device 34 is coupled to a pull-up resistor 42, which in turn is coupled to the voltage source 40. The opposite terminal of the device 34 is coupled to ground. In this embodiment, when no light falls on the light-sensitive device 34, the device operates as an open switch. As a result, the voltage at an input (INPUT1) to the processor 44 is pulled up approximately to the voltage of the voltage source 40. When light falls on the light-sensitive device 34, however, it operates as a closed switch and the voltage is pulled down to a voltage approximately equal to ground. In this manner, the light sensitive device 34 is able to signal to the processor 44 when light is detected passing through the window(s) 32a, 32b of the housing 30.

In other embodiments, the light sensitive device 34 may comprise a different component, such as a photodiode or a photovoltaic cell. Additionally, in other embodiments, the signaling methodology may be different. For example, instead of producing a particular voltage upon detecting light, as in the case of the circuitry of FIG. 4, a photodiode or phototransistor could instead cause a current to flow that is then detected by the processor 44. Alternatively, the phototransistor or photodiode could be configured to pass a signal to a chip enable signal to a circuit that creates a signal that is input to the microprocessor. In other embodiments, light falling on the light-sensitive device could cause a circuit to become open, thereby preventing a current from flowing or creating a different voltage that could then be detected by the processor. In still other embodiments, the light sensitive device may comprise a photovoltaic cell that itself generates a voltage or current when light falls on the device. That voltage or current could then be detected by the processor.

In some embodiments, where the metering device is battery powered, it may be preferable to power the pull-up resistor 42 from a pin (not shown) of the processor 44. In this manner, the light sensitive device may be selectively powered and "polled" by the processor 44 to save power, instead of being constantly powered by the voltage source 40.

The processor 44 may control the overall operation of the metering device. In one embodiment, the processor may execute program code or firmware stored in a memory 50 coupled to the processor. The processor may also store data and other operating parameters in the memory 50, as well as in one or more internal registers (not shown). The program code/firmware, data and operating parameters may collectively represent a configuration of the metering device 10.

The processor 44 may be coupled to communications circuitry 46. The communications circuitry 46 may implement any of a wide variety of communications technologies. For example, the communications circuitry 46 may comprise a wireless transceiver that enables the metering device to communicate wirelessly with other devices. Alternatively, the communication circuitry 46 may comprise a modem or other network interface for communicating over a wired network, such as the Internet or a telephone network. Still further, the communication circuitry may comprise an optical port by which the metering device may communicate via transmission of light signals.

As is common in many metering devices, the metering device may be reconfigured in the field (i.e., at a customer site). For example, it may be possible to replace or alter the program code or firmware stored in the memory 50 and that the processor 44 executes. Alternatively, or in addition, it may be possible to alter various operating parameters of the metering device that may be stored in the memory 50 or in one or more registers (not shown) internal to the processor. Such reconfiguration may be performed or controlled by communicating with the processor 44 via the communications circuitry 46. For example, a field technician may utilize a handheld programming device at a customer location to communicate with the metering device for the purpose of reconfiguring it in any of the manners described above.

As further shown in FIG. 4, at least a portion of the circuit board 41 may be environmentally sealed with a material 43 that prevents air, water and/or other contaminants from reaching the components of the circuit board 41. While only some of the components are sealed in this example, in other embodiments, the entire circuit board 41 may be sealed. The material 43 providing the environmental seal may comprise any of a wide variety of suitable materials, including without limitation, conformal coatings, potting and/or vacuum deposition (using parylene for example). Preferably, the material 43 is transparent or translucent so that light passing through the window(s) 32a, 32b of the housing 30 is able to reach the light-sensitive device though the environmentally sealing. In one embodiment, all of the environmental sealing 43 may be transparent or translucent, but in other embodiments, only the portion that covers the light-sensitive device may be transparent or translucent.

According to one aspect of the invention, reconfiguration of the metering device is prevented unless light is detected passing through the window(s) 32a, 32b of the housing 30. That is, the processor 44 is programmed to prevent reconfiguration unless it receives a signal from the light sensitive device 34 indicating that light has been detected passing through the window(s) 32a, 32b of the housing. Thus, no reconfiguration may be performed without exposing the window(s) 32a, 32b to enable light to pass through it (them) and onto the light-sensitive device 34. As can be appreciated, in the embodiment illustrated in FIGS. 1-4, the index assembly 28 may be removed to enable light to pass through the window 32a on the front of the housing 30. Alternatively, or in addition, the housing 30 itself may be removed from the main body 12 of the meter 10 to enable light to pass through the window 32b on the back of the housing 30.

Figure 5:
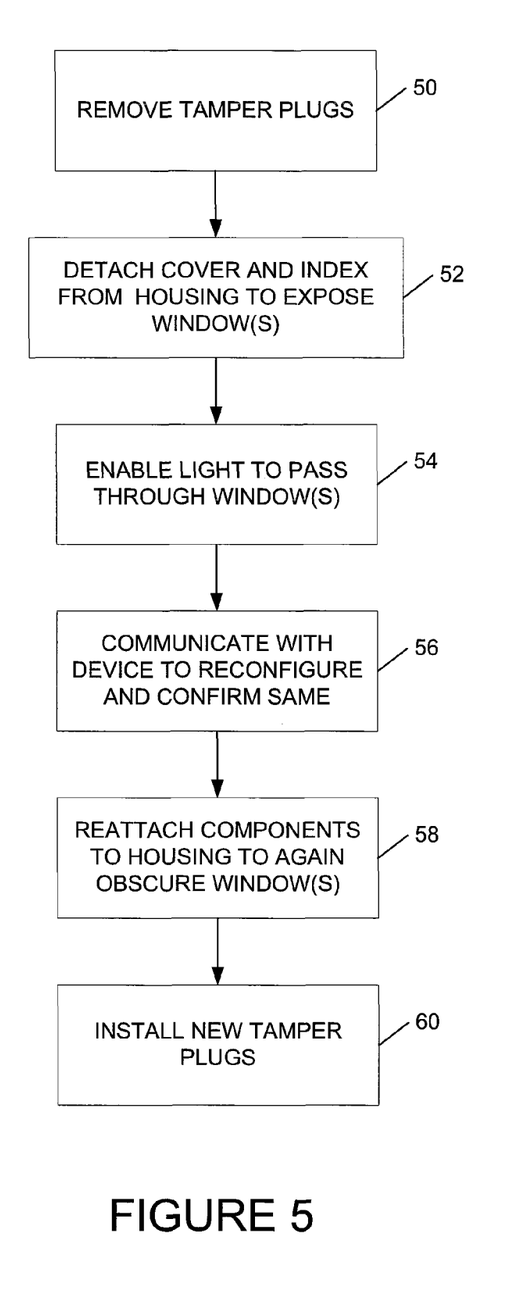
FIG. 5 is a flow diagram illustrating one embodiment of a method for reconfiguring a metering device.

FIG. 5 illustrates one embodiment of a method by which a person, such as a field technician, may reconfigure the metering device 10. At step 50, any tamper indicator(s), such as tamper plugs 20, are removed. As mentioned above, doing so will break, deform or otherwise destroy the tamper indicator(s), thereby providing a physical indication that an effort has been made to detach the cover 24 from the housing 30. At step 52, the cover 24 (which typically is transparent) and the index assembly 28 may then be detached from the housing 30 to expose the window 32a. In addition, or alternatively, the housing 30 itself may be detached from the main body 12 of the meter to expose window 33b. At step 54, the technician may enable light to pass through one or both of the windows 32a and/or 33b of the housing 30. In one embodiment, this may take the form simply of exposing the window(s) 32a, 32b to ambient light (e.g., sunlight) by removing any component(s) covering it (them), such as the index assembly 28. In another embodiment, step 54 may involve applying a light source to the window(s) 32a, 32b. Depending on the particular type of light-sensitive device 34 employed, the applied light source may comprise a visible light source, an ultra-violet light source and/or an infrared light source.

Once light is detected by the light sensitive device 34, resulting in a signal indicating such detection being provided to the processor 44, the event may be recorded by processor 44, and reconfiguration may be permitted. A record of the event in the processor may be reported to, or retrieved by, a utility control station or a field technician, via the communication circuitry 46. At step 56, the technician may then reconfigure the meter as desired. For example, the technician may use a hand-held programming unit to download new program code or firmware to the device via the meter's communication circuitry 46. Alternatively, or in addition, the technician may alter one or more operational parameters of the metering device stored in the memory 50 or internal to the processor 44.

Once the light exposure and reconfiguration events have occurred and been recorded by the processor, the occurrence of either or both may be communicated to the technician and/or network. At step 58, all pieces of the meter 10 may be reassembled, thus again obscuring the window(s) 32*a*, 32*b* and preventing light from passing through it (them). At step 60, a new tamper indicator(s) is installed.

While in the embodiment described above, there is one light-sensitive device 34, in other embodiments there may be multiple light-sensitive devices 34. In such embodiments, each of the multiple light-sensitive devices 34 may have a corresponding window(s) disposed proximate to it. Alternatively, a single window could expose each of the light sensitive devices. In one embodiment, reconfiguration may be prevented unless light is detected by each of the multiple light-sensitive devices 34 simultaneously. In other embodiments, a more complex algorithm could be employed. For example, reconfiguration may be prevented unless light is detected by some light-sensitive devices but not others. Alternatively, reconfiguration may be prevented unless the light-sensitive devices detect light in some sequence. In such embodiments, the processor 44 would be programmed to recognize the sequence.

Additionally, the timing associated with the detection of light may take several forms. In one embodiment, reconfiguration may be permitted simply upon detection of light at any time. In other embodiments, reconfiguration may be permitted only during the period that light is present, thereby requiring the technician to maintain light through the window(s) 32*a*, 32*b* for the duration of the reconfiguration operation. In other embodiments, the detection of light by the light-sensitive device may activate a timing circuit or timing firmware which allows a specific duration for reconfiguration that then expires after a time out. That duration could be fixed or configurable.

Thus, the metering device and method for reconfiguring the device described herein will satisfy those regulatory agencies that require that a metering device be disassembled in some way prior to allowing any reconfiguration of the device, but will do so without breaking or otherwise affecting the environmental sealing of the device. While certain embodiments have been described above, it is understood that modifications and variations may be made without departing from the principles described above and set forth in the following claims. For example, while the housing 30 is shown as a separate register module that is attached to a main body 12 of the meter 10, in other embodiments, the light sensitive device and related components may be embedded in the meter, rather than part of a module that is attached to the meter. In such a case, the main body 12 of the meter would itself define the housing 30, as that term is used herein and in the claims. Accordingly, reference should be made to the following claims as describing the scope of the present invention.

What is claimed:

1. A metering device comprising:
    a housing containing at least one circuit board comprising a processor and a light-sensitive device in electrical communication with the processor, the housing having at least one window disposed proximate the light-sensitive device, the light-sensitive device being configured to detect light passing through the at least one window into the housing and to provide a signal indicating same to the processor, the processor being configured to prevent reconfiguration of the metering device when no light is detected by the light-sensitive device;
    at least one other component detachably coupled to the housing, and when coupled to the housing, preventing the at least one window of the housing from being exposed to light; and
    at least one tamper indicator that provides a physical indication when said other component is detached from the housing.

2. The metering device recited in claim 1, wherein the light-sensitive device is configured to detect one of visible light, ultra-violet light or infrared light.

3. The metering device recited in claim 1, wherein the light-sensitive device comprises a photodiode, a photovoltaic cell or a phototransistor.

4. The metering device recited in claim 1, wherein the at least one tamper indicator comprises at least one of a tamper plug or a sealing ring.

5. The metering device recited in claim 1, wherein the at least one circuit board further comprises a power source that provides power to the light-sensitive device.

6. The metering device recited in claim 1, wherein the light-sensitive device receives power from an output of the processor.

7. The metering device recited in claim 6, wherein the processor is configured to poll the light-sensitive device for said signal.

8. The metering device recited in claim 1, wherein the light-sensitive device comprises a plurality of light-sensitive devices, and wherein the microprocessor is configured to permit reconfiguration of the device when light is detected by more than one of said light-sensitive devices.

9. The metering device recited in claim 8, wherein the microprocessor is configured to permit reconfiguration of the device when light is detected by said plurality of light-sensitive devices in a predetermined sequence.

10. The metering device recited in claim 1, wherein at least a portion of the circuit board including at least said light-sensitive device is environmentally sealed with a material that is transparent or translucent such that light may pass through the material to the light-sensitive device.

11. The metering device recited in claim 1, wherein the material providing the environmental seal comprises at least one of a conformal coating, potting or a vacuum deposition.

12. The metering device recited in claim 1, wherein said at least one other component comprises a means for securing the housing to another portion of the metering device, a cover or an index.

13. The metering device recited in claim 1, wherein the processor records information indicating that it has received said signal from the light-sensitive device indicating that light has been detected passing through said at least one window.

14. The metering device recited in claim 13, wherein the metering device further comprises communications circuitry, and wherein the recorded information is communicated via the communications circuitry to at least one of a field technician or a utility.

15. A method of reconfiguring a metering device, wherein the metering device comprises a housing containing at least one circuit board comprising a processor and a light-sensitive device in electrical communication with the processor, the housing having at least one window disposed proximate the light-sensitive device, the light-sensitive device being configured to detect light passing through the at least one window and to provide a signal indicating same to the processor, the processor being configured to prevent reconfiguration of the metering device when no light is detected by the light-sensitive device, the metering device further comprising at least one other component detachably coupled to the housing and when coupled to the housing preventing light from passing through the at least one window, and at least one tamper indicator that provides a physical indication when said at least one other component is detached from the housing, the method comprising:

detaching said at least one other component from the housing such that the at least one tamper indicator is caused to provide a physical indication of said detaching and such that said at least one other component does not prevent light from passing through the at least one window;

applying light to the at least one window of the housing, such that the light passes through the at least one window of the housing and is detected by the light-sensitive device of the meter; and thereafter,     communicating with the processor of the housing to reconfigure the metering device.

16. The method recited in claim 15, wherein the at least one tamper indicator comprises at least one of a tamper plug or a sealing ring and wherein said detaching comprises breaking or deforming the at least one tamper plug or sealing ring.

17. The method recited in claim 15, further comprising:
    after reconfiguring the metering device, reattaching the at least one other component to the housing; and then,
    replacing said at least one tamper indicator.

18. The method recited in claim 15, wherein applying light to the at least one window of the housing comprises exposing the at least one window to ambient light.

19. The method recited in claim 15, wherein applying light to the at least one window of the housing comprises applying a light source to the at least one window.

20. The method recited in claim 19, wherein applying the light source comprises applying a visible light source, an ultra-violet light source or an infrared light source.

21. The method recited in claim 15, wherein at least a portion of the circuit board including at least said light-sensitive device is environmentally sealed with a material that is transparent or translucent such that light may pass through the material to the light-sensitive device, and wherein said detaching, applying and communicating are performed without disturbing said material.

\* \* \* \* \*